United States Patent
Yamaguchi

(10) Patent No.: US 8,699,108 B2
(45) Date of Patent: Apr. 15, 2014

(54) IMAGE PROCESSING DEVICE AND COMPUTER READABLE MEDIUM FOR CONVERTING A DRAW PROCESS

(75) Inventor: Yuta Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 937 days.

(21) Appl. No.: 12/609,678

(22) Filed: Oct. 30, 2009

(65) Prior Publication Data

US 2010/0290096 A1 Nov. 18, 2010

(30) Foreign Application Priority Data

May 18, 2009 (JP) ................. 2009-119399

(51) Int. Cl.
*H04N 1/46* (2006.01)
*H04N 1/40* (2006.01)

(52) U.S. Cl.
USPC .......................................... 358/538; 358/462

(58) Field of Classification Search
None
See application file for complete search history.

(56) References Cited

U.S. PATENT DOCUMENTS

2006/0279813 A1* 12/2006 Ozawa et al. ................. 358/538
2009/0213406 A1* 8/2009 Kimura ........................ 358/1.13

FOREIGN PATENT DOCUMENTS

| JP | 1-214442 | 8/1989 |
|---|---|---|
| JP | A-6-87251 | 3/1994 |
| JP | A-8-90839 | 4/1996 |
| JP | A-2003-298853 | 10/2003 |
| JP | A-2006-180388 | 7/2006 |

OTHER PUBLICATIONS

Notification of Reasons for Refusal dated Jun. 18, 2013 from Japanese Patent Application No. 2009-119399 (with English-language translation).

Apr. 2, 2013 Office Action issued in Japanese Application No. 2009-119399 (with English Translation).

* cited by examiner

*Primary Examiner* — Firmin Backer
*Assistant Examiner* — Christopher D Wait
(74) *Attorney, Agent, or Firm* — Oliff PLC

(57) ABSTRACT

An image processing device includes an acceptance unit which accepts an input of print data; a decision unit which decides whether or not a draw instruction for a two-color image consisting of a background color and a foreground color is contained in the print data accepted by the acceptance unit; and a conversion unit which converts to draw a graphic representing a part of the foreground color in the two-color image for an image drawn area, instead of a draw process in pixel units concerning the two-color image, when the decision unit decides that the draw instruction for the two-color image is contained in the print data.

7 Claims, 9 Drawing Sheets

BINARY DATA OF
BLACK AND WHITE (BW IMAGE)

DATA OF TWO COLORS
(INDEX COLOR IMAGE OF TWO COLORS
OF WHITE + (ANOTHER COLOR))

THIS PART IS GRAPHICIZED

BLACK PIXELS CONTINUOUS
IN MAIN SCAN DIRECTION ARE
CONVERTED INTO GRAPHIC

+ (TRANSMISSION PROCESS FOR WHITE PART) + (DRAWING COLOR)

THREE TIMES OF OVERWRITE OPERATIONS ARE REQUIRED

UNDER LAYER    DRAWING COLOR    IMAGE    DRAWING COLOR

DRAWING COLOR    BLACK AREA

IMAGE WHICH IS NOT SUITED
TO GRAPHIC CONVERSION

IMAGE WHICH IS SUITED
TO GRAPHIC CONVERSION

IMAGE PROCESSING DEVICE AND COMPUTER READABLE MEDIUM FOR CONVERTING A DRAW PROCESS

CROSS-REFERENCE TO RELATED APPLICATION

This application is based on and claims priority under 35 USC 119 from Japanese Patent Application No. 2009-119399 filed on May 18, 2009.

BACKGROUND

1. Technical Field

The present invention relates to an image processing device and a computer readable medium.

2. Related Art

In a print process for an electronic document, a terminal device generates print data expressive of those page contents of the electronic document which have been instructed by a manipulator to be printed, and it transmits the print data to a print device, whereupon the print device records (prints) a page image based on the print data, onto paper or the like record medium by an image formation unit.

Here, the general print data are invoked as PDL (Page Description Language) data which express the page contents to-be-printed by using the draw instructions and logic operations of various objects such as characters, images and graphics. In addition, the print device includes an image processing unit which generates the page image to-be-printed on the basis of the PDL data inputted (transmitted) from the terminal device, and the page image generated by the image processing unit is used for the record (print) onto the record medium by the image formation unit.

SUMMARY

According to the aspect of the invention, an image processing device includes an acceptance unit which accepts an input of print data; a decision unit which decides whether or not a draw instruction for a two-color image consisting of a background color and a foreground color is contained in the print data accepted by the acceptance unit; and a conversion unit which converts to draw a graphic representing a part of the foreground color in the two-color image for an image drawn area, instead of a draw process in pixel units concerning the two-color image, when the decision unit decides that the draw instruction for the two-color image is contained in the print data.

BRIEF DESCRIPTION OF THE DRAWINGS

Exemplary embodiments of the invention will be described in detail based on the following figures, wherein:

FIGS. 3A and 313 are diagrams for explaining the contents of a graphic conversion according to the first example of the invention;

DETAILED DESCRIPTION

Figure 1:
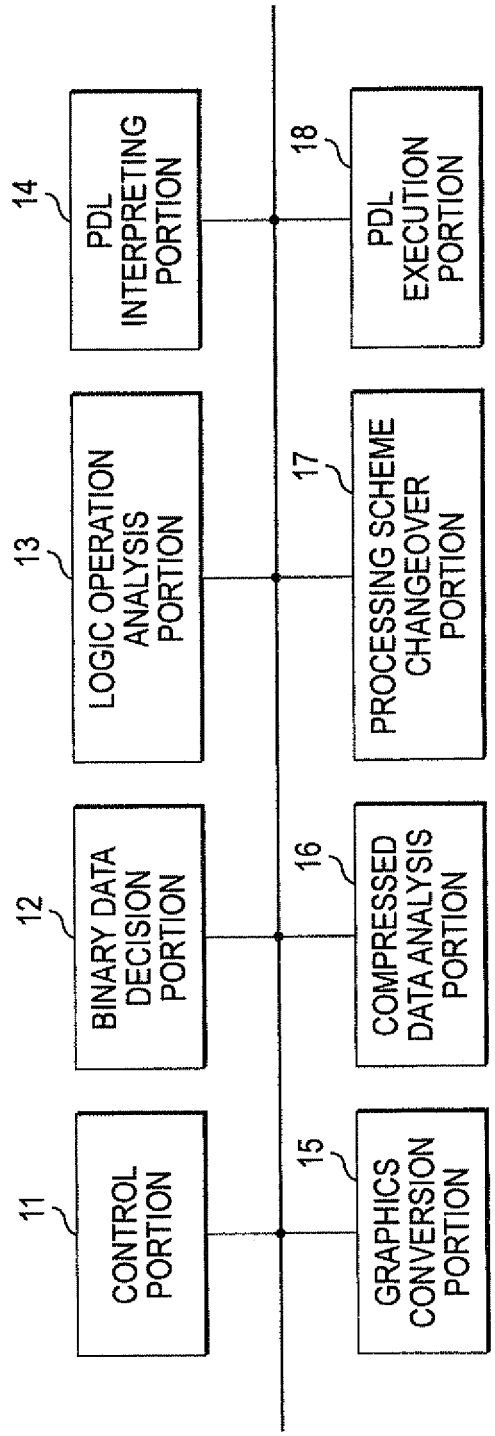
FIG. 1 is a diagram exemplifying the functional blocks of an image processing device according to one exemplary embodiment of the present invention.

One exemplary embodiment of the present invention will be described with reference to the drawing.

FIG. 1 exemplifies the functional blocks of an image processing device according to the exemplary embodiment of the present invention.

The image processing device of this exemplary embodiment is installed on a print device as an image processing unit which generates a page image to-be-printed on the basis of PDL data (an example of print data) that are inputted (transmitted) from a terminal device. This image processing device includes functional portions such as a control portion 11, a binary data decision portion 12, a logic operation analysis portion 13, a PDL interpreting portion 14, a graphic conversion portion 15, a compressed data analysis portion 16, a processing scheme changeover portion 17, and a PDL execution portion 18. Incidentally, the image processing device may well be installed on another apparatus such as a multi-functional machine which includes the functions of, for example, print, copy and FAX in multiple fashions.

The control portion 11 generally controls an image process which generates the page image to-be-printed on the basis of the PDL data. When the control portion 11 accepts the input of the PDL data from outside (for example, the terminal device), it invokes the individual functional portions such as the binary data decision portion 12, logic operation analysis portion 13, PDL interpreting portion 14, graphic conversion portion 15, compressed data analysis portion 16, processing scheme changeover portion 17 and PDL execution portion 18, and it images the pertinent PDL data (generates the page image to-be-printed).

The PDL interpreting portion 14 executes a PDL interpreting process which analyzes the PDL data, and which interprets the draw instructions, logic operations, etc. of various objects such as characters, images and graphics contained in the PDL data. Here in this specification, the draw instructions, logic operations, etc. of the various objects such as characters, images and graphics shall be generically termed "PDL commands". In particular, the draw instruction of an image shall be termed the "image command", and the draw instruction of a graphic the "graphic command".

The binary data decision portion 12 executes a binary data decision process which decides whether or not the image command contained in the PDL data is an image command concerning a binary, black-and-white image, or whether or not it is an image command concerning a two-color image.

The logic operation analysis portion 13 executes a logic operation analysis process which analyzes the operation contents of the logic operation contained in the PDL data.

The graphic conversion portion 15 executes a graphic conversion process by which the instruction contents of the image command (and the combination thereof with the logic operation) contained in the PDL data are re-expressed using graphic commands.

The compressed data analysis portion 16 executes a compressed data analysis process which decides whether or not the compression rate of the image of the image command contained in the PDL data flails a preset criterion.

The processing scheme changeover portion 17 executes a processing scheme changeover process which changes-over a processing scheme from an ordinary image process where the instruction contents of the image command (and the combination thereof with the logic operation) contained in the PDL data are executed as they are, to a special image process where a result converted by the graphic conversion portion 15 is executed instead of the instruction contents.

The PDL execution portion 18 executes a PDL execution process which executes the PDL command, and which writes a consequently formed page image into a memory (page buffer) disposed in the print device, so as to store the page image. The page image formed on the memory of the print device by the PDL execution process is used for record (print) onto paper or the like record medium by the image formation unit 25 (refer to FIG. 10) of the print device.

Concrete processing contents based on the image processing device of this exemplary embodiment will be described in connection with examples.

EXAMPLE 1

As the first example, there will be described a case where image commands which concern images of two colors consisting of a background color and a foreground color (as include binary images of black and white) are contained in PDL data inputted from the terminal device.

Figure 2A:
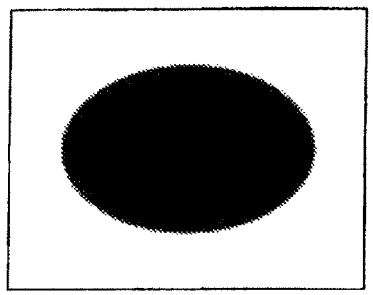
FIGS. 2A and 2B are diagrams exemplifying a binary image of black and white and an image of two colors, respectively.
Figure 2B:
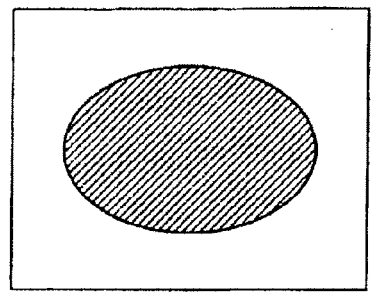

By way of example, image commands are sometimes issued as PDL commands when binary image data of black and white (a BW image), the background color and foreground color of which are white and black as exemplified in FIG. 2A, respectively, and two-color image data (an index color image of two colors, the background color and foreground color of which are white and another color, respectively) as exemplified in FIG. 2B, have been processed by a PDL generation portion (client driver) on the side of the terminal device.

When, in the case where the image command has been issued as the PDL command by the terminal device even for such a simple image, this image command is processed (ordinary image process) as it is, data (the pixel values of the background color or the foreground color) are written into the memory in pixel units, and hence, memory accesses (data write steps) corresponding to an image size (the number of pixels) take place.

In contrast, according to the image processing device of this exemplary embodiment, the image command concerning the simple image is not processed (ordinary image process) as the image command itself, but it is processed as follows: The processing scheme is changed-over from the ordinary image process to the special image process by the processing scheme changeover portion 17, the pertinent image command is re-expressed using a graphic command by the graphic conversion portion 15, thereby to convert process contents, and the PDL execution portion 18 is caused to execute the result of the conversion.

Figure 3A:
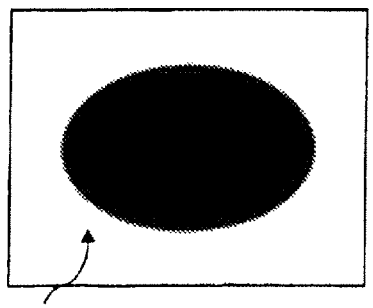
Figure 3B:
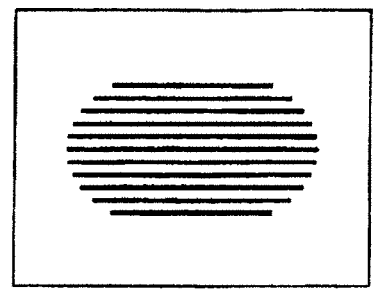

The graphic conversion portion 15 re-expresses the binary image data of black and white as exemplified in FIG. 2A, with a part of a foreground color (having black pixels) as a subject for graphitization, as shown in FIG. 3A, and by using the graphic command of segments representing the pixels of the foreground color (black pixels) continuous in a main scan direction, as shown in FIG. 3B. That is, the shape of the foreground color part is reproduced by information which specifies the same feature as that of the shape. In this example, the shape of the foreground color part is reproduced using at least one segment in the main scan direction, and the coordinates of the starting point and end point of each segment are specified by detecting the boundaries between a background color part and the foreground color part in the main scan direction.

Besides, the two-color image data exemplified in FIG. 2B are similarly re-expressed with a foreground color part as a subject for graphitization, and by using the graphic command of segments which represent the pixels of a foreground color continuous in a main scan direction.

Alternatively, the graphic conversion portion 15 may well convert the process contents so as to perform instead of the above image command concerning the binary or two-color image, the first step of filling the drawn area of the image collectively (at high speed) with the background color in the pertinent image, and the second step of executing the graphic command of a graphic which represents the foreground color part of the image (in this example, the graphic command of at least one segment), for the drawn area having been filled and with the foreground color of the pertinent image.

In addition, the PDL execution portion 18 is caused to execute the process contents of the result of the conversion. Thus, the number of memory accesses is made less than in the ordinary image process in which the pixel values are written in pixel units. That is, it is dispensed with to perform the memory accesses in the pixel units of the image.

Figure 4:
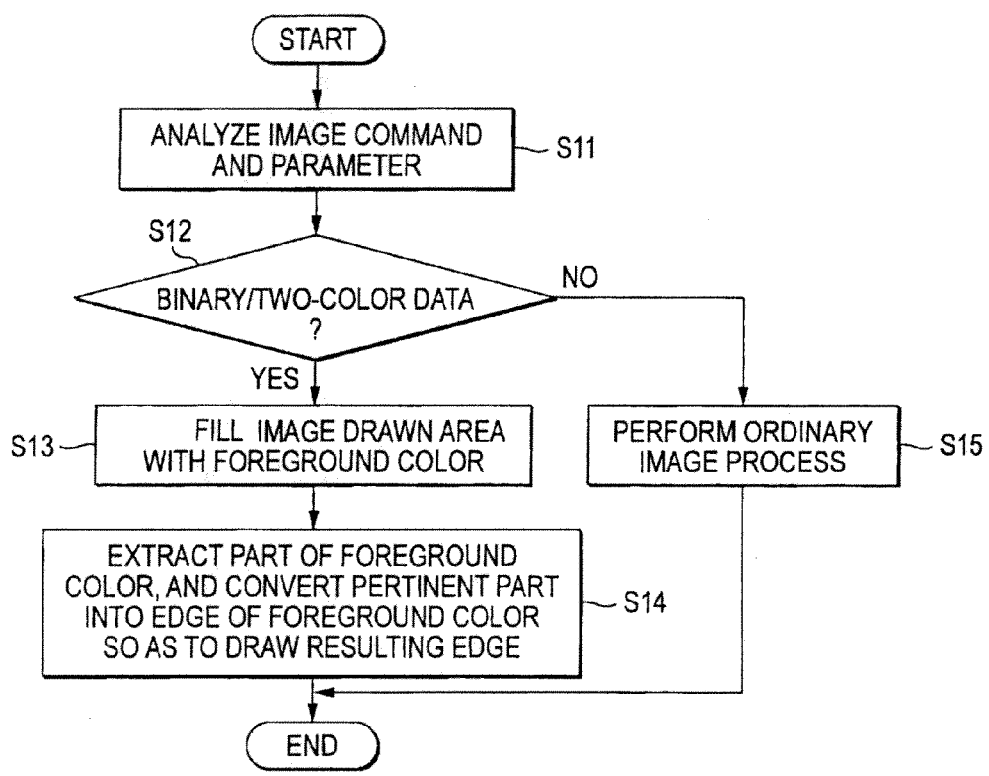
FIG. 4 is a chart exemplifying a processing flow according to the first example of the invention.

FIG. 4 exemplifies a processing flow in the case where the image command concerning the binary or two-color image is contained in the PDL data inputted from the terminal device.

When the image processing device accepts the PDL data inputted from the terminal device, the PDL interpreting portion 14 analyzes the inputted PDL data, and it also analyzes the preset parameter of the image command in the case where this image command is contained (step S11). In addition, the binary data decision portion 12 decides whether or not the pertinent image command is the image command concerning the binary or two-color image, on the basis of the analyzed result of the preset parameter of the image command by the PDL interpreting portion 14. Further, the processing scheme changeover portion 17 changes-over a processing scheme for the pertinent image command, to the ordinary image process or the special image process in accordance with the result of the decision by the binary data decision portion 12 (step S12).

Concretely, in a case where it has been decided at the step S12 that the image command to be handled is not the image command concerning the binary or two-color image, the ordinary image process is performed for the pertinent image command (step S15). That is, the PDL execution portion 18 performs a process for writing the data (pixel values) into the memory (page buffer) in pixel units on the basis of the pertinent image command.

On the other hand, in a case where it has been decided at the step S12 that the image command to be handled is the image command concerning the binary or two-color image, the special image process (steps S13 and S14) is performed for the image command. More specifically, the graphic conversion portion 15 re-expresses the pertinent image command by using a graphic command. In addition, the PDL execution portion 18 fills the drawn area of the image with the background color of the image concerning the pertinent image command, on the basis of the converted result of the image command by the graphic conversion portion 15 (step S13), and the graphic command of the segment representing the foreground color part of the pertinent image is executed for the drawn area having been filled and with the foreground color of the pertinent image, that is, the shape of the foreground color part in the pertinent image is converted into the edge information of the foreground color, which is drawn (step S14).

By the way, in this example, the image command is re-expressed using the graphic command of the segment in the main scan direction. However, another graphic command may well be used in such a manner that the image command is re-expressed using, for example, the graphic command of a contour line. Essentially, it suffices that the number of memory accesses becomes smaller than in the ordinary image process in which the pixel values are written in pixel units.

EXAMPLE 2

As the second example, there will be described a case where the designation of a transmission process which uses a logic operation for the image command of a binary image of black and white is contained in PDL data inputted from the terminal device.

Figure 5A:
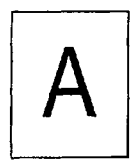
FIGS. 5A and 5B are diagrams for explaining a transmission process based on an ordinary image process.

There is, for example, a case where the image command and a PDL command are issued. The image command is of the binary, black-and-white image on a front surface side to be subjected to the transmission process, as exemplified in FIG. 5A. The PDL command is in the combination of the designation of the logic operation having the contents that a white (background color) part in the binary, black-and-white image is transmitted with a black (foreground color) part left behind (the image of an under layer (rear surface side) is displayed at the corresponding part), and the designation of a drawing color for drawing the black (foreground color) part of the binary, black-and-white image.

Figure 5B:
Figure 5B:
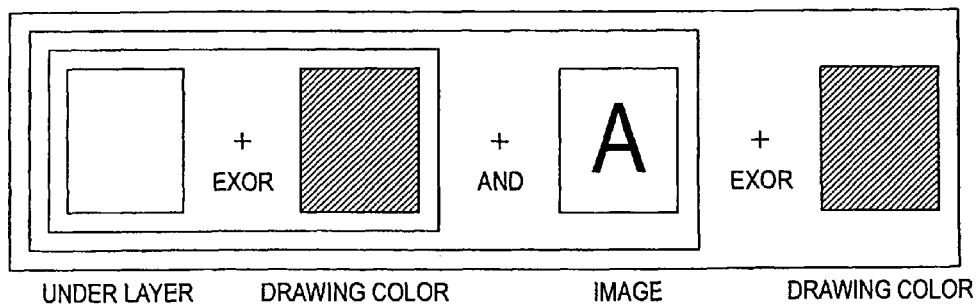

When the PDL command concerning such a transmission process is directly processed (as the ordinary image process) using the logic operation for the image command, the process becomes as exemplified in FIG. 5B. More specifically, first of all, an exclusive logical sum (EXOR) is computed for the image of the under layer (rear surface side) and the designated drawing color, and the resulting image data are written into the memory. Subsequently, a logical product (AND) is computed for the pertinent image data and the binary, black-and-white image (on the front surface side) in the PDL command, and the resulting image data are written into the memory. Lastly, an exclusive logical sum (EXOR) is computed for the pertinent image data and the designated drawing color, and the resulting image data are written into the memory. In the process, therefore, three times of overwrite operations into the memory occur (memory accesses for three images in pixel units).

In contrast, in the image processing device of this exemplary embodiment, the PDL command concerning the transmission process which uses the logic operation for the image command of the binary, black-and-white image is not processed (as the ordinary image process) by using the logic operation for the image command. Here, the processing scheme is changed-over from the ordinary image process to the special image process by the processing scheme changeover portion 17, and the PDL command concerning the pertinent transmission process is re-expressed using the graphic command by the graphic conversion portion 15, thereby to convert the process contents. The PDL execution portion 18 is caused to execute the result of the conversion.

Figure 6B:
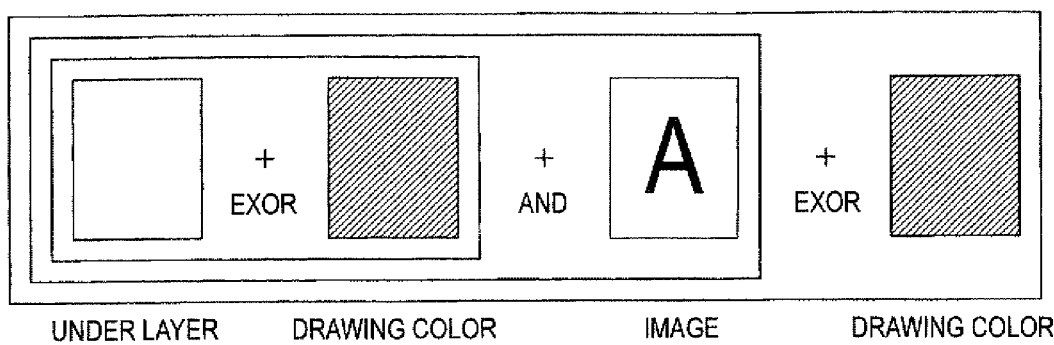
FIGS. 6A and 6B are diagrams for explaining a transmission process which involves a graphic conversion according to the second example of the invention.
Figure 6A:
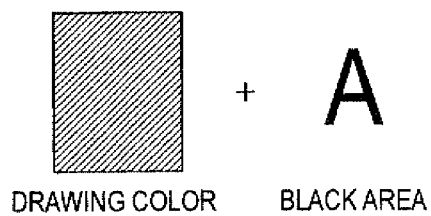

Concretely, the graphic conversion portion 15 re-expresses the PDL command concerning the transmission process which uses the logic operation for the image command of a binary, black-and-white image as exemplified in FIG. 6A, with a subject for graphitization being the part of a foreground color (part of a black pixel) in the binary, black-and-white image (on a front surface side) which concerns the image command, and by using the graphic command of a segment which represents the pixel of the foreground color (black pixel) continuous in a Main scan direction. That is, the shape of the foreground color part is reproduced by information which specifies the same feature as that of the shape. In this example, the shape of the foreground color part is reproduced using at least one segment in the main scan direction, and the coordinates of the starting point and end point of each segment are specified by detecting the boundaries between a background color part and the foreground color part in the main scan direction.

Alternatively, the graphic conversion portion 15 converts the process contents so as to perform instead of the PDL command concerning the transmission process, a process in which, as shown in FIG. 6B, the graphic command of a graphic (in this example, the graphic command of at least one segment) representing the foreground color part in the binary, black-and-white image (front face side) is executed with a designated drawing color, for a drawn area where the image of an under layer (rear surface side) in the transmission process is drawn.

In addition, the PDL execution portion 18 is caused to execute the process contents of the result of the conversion, whereby the number of memory accesses is made less than in the ordinary image process in which pixel values are written in pixel units. That is, it is dispensed with to perform the three times of overwrite operations into the memory (the memory accesses in pixel units for three images).

Figure 7:
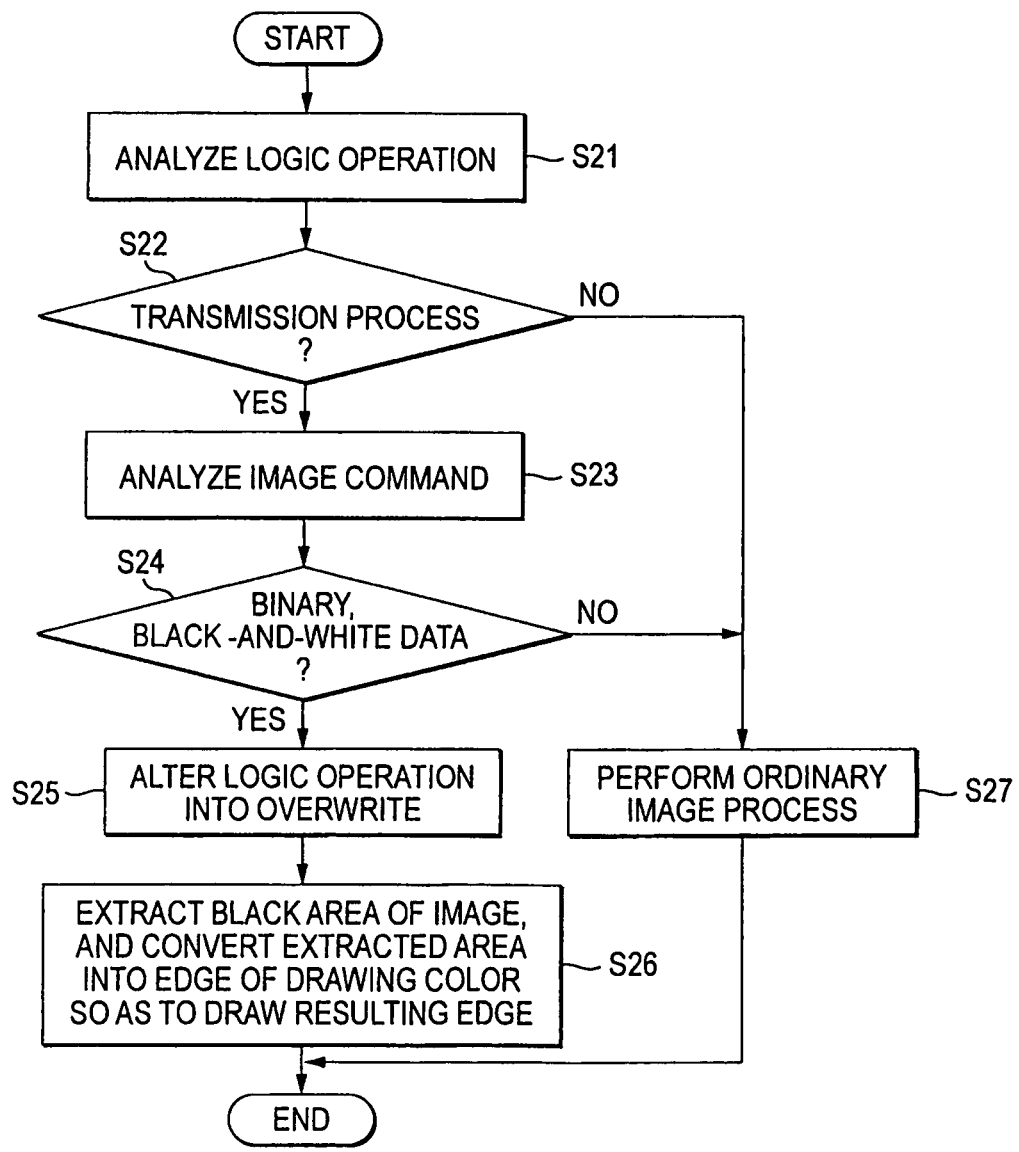
FIG. 7 is a chart exemplifying a processing flow according to the second example of the invention.

FIG. 7 exemplifies a processing flow in the case where the designation of the transmission process which uses the logic operation for the image command of the binary, black-and-white image is contained in the PDL data inputted from the terminal device.

When the image processing device accepts the PDL data inputted from the terminal device, the PDL interpreting portion 14 analyzes the PDL data inputted from the terminal device. In the case where the logic operation is contained, the logic operation analysis portion 13 analyzes the contents of the operation (step S21), and it decides whether or not the transmission process is designated (step S22).

In a case where it has been decided at the step S22 that the contents of the operation are the designation of the transmission process, the PDL interpreting portion 14 further analyzes the preset parameter of the image command given together with the logic operation (step S23), and the binary data decision portion 12 decides whether or not the pertinent image command is the image command concerning the binary, black-and-white image, on the basis of the analyzed result of the preset parameter of the image command by the PDL interpreting portion 14 (step S24).

In addition, in a case where it has been decided at the step S22 that the contents of the operation are not the designation of the transmission process, or in a case where it has been decided at the step S22 that the contents of the operation are the designation of the transmission process, but where it has been decided at the step S24 that the pertinent image command is not the image command concerning the binary, black-and-white image, the processing scheme changeover portion 17 changes-over the processing scheme so as to select the ordinary image process. On the other hand, in a case where the designation of the transmission process has been decided at the step S22 and where the image command concerning the binary, black-and-white image has been decided at the step S24, the processing scheme changeover portion 17 changes-over the processing scheme so as to select the special image process.

In a case where the ordinary image process has been selected, the PDL execution portion 18 executes the process in accordance with the instruction contents of the PDL command (step S27).

In a case where the special image process has been selected, the graphic conversion portion 15 re-expresses the image command concerning the binary, black-and-white image, by using the graphic command, and it alters the designation of the logic operation into that of overwrite (step S25). In addition, the PDL execution portion 18 executes the graphic command of a segment which represents the foreground color part of the image concerning the pertinent image command, with a designated drawing color, for a drawn area where the image of an under layer (rear surface side) in the transmission process is drawn, on the basis of the result of the conversion of the image command by the graphic conversion portion 15. That is, the PDL execution portion 18 converts the shape of the foreground color part in the image, into the edge information of the drawing color, and then draws the edge information (step S26).

By the way, in this example, the image command is re-expressed using the graphic command of the segment in the main scan direction. However, another graphic command may well be used in such a manner that the image command is re-expressed using, for example, the graphic command of a contour line. Essentially, it suffices that the number of memory accesses becomes smaller than in the ordinary image process in which the pixel values are written in pixel units.

EXAMPLE 3

As the third example, there will be described condition under which an image command is subjected to a graphic conversion (it is re-expressed using a graphic command).

Figure 8A:
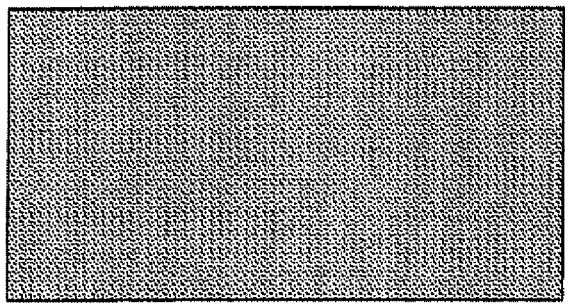
FIGS. 8A and 8B are diagrams for explaining images which are subjects for a graphic conversion according to the third example of the invention.

In spite of a binary, black-and-white image or a two-color image, an image whose background color and foreground color change-over frequently every pixel as exemplified in FIG. 8A, is not suited to the graphic conversion. More specifically, when the shape of the foreground color part of such an image is re-expressed using the graphic command, a time period required for the process or the number of times of write operations into the memory increases more than in the case of directly processing the image command, and the image processing sometimes becomes slow without being heightened in speed. Incidentally, as the image whose foreground color and background color change-over frequently, there is mentioned, for example, an image to which a halftone process is adapted, or an image of checkered pattern.

Figure 8B:
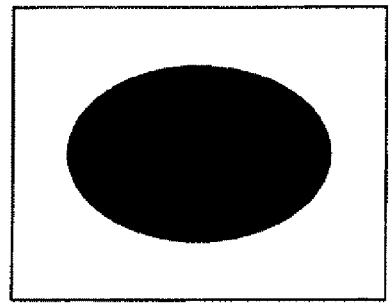

In the image processing device of this exemplary embodiment, therefore, note is taken of the property that the foreground color and the background color change-over frequently, and the image command to be processed is analyzed. In a case where the pertinent image is compressed by a compression scheme whose compression rate fluctuates in accordance with a run length (the continuation number of an identical pixel value), the process is changed-over adaptively in accordance with the compression rate of the image so that the graphic conversion may not be performed for the image of bad compression rate as exemplified in FIG. 8A, whereas the graphic conversion may be performed for an image of good compression rate as exemplified in FIG. 8B. By the way, in this example, the image of the image command is subjected to a compression process on the side of the terminal device.

Figure 9:
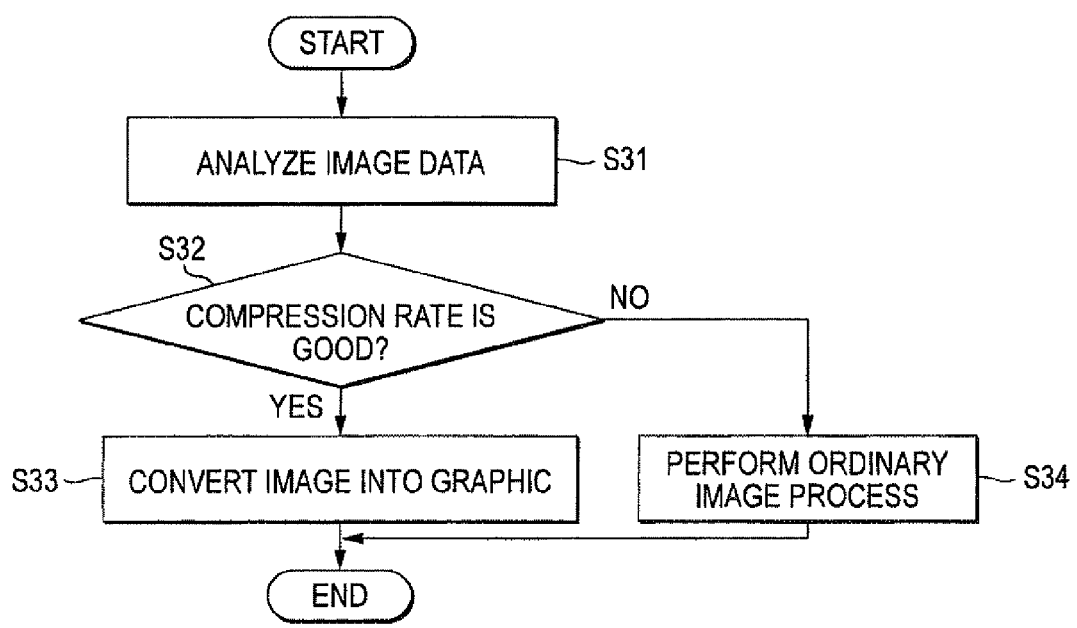
FIG. 9 is a chart exemplifying a processing flow according to the third example of the invention.

FIG. 9 exemplifies a processing flow which concerns the changeover of the processing scheme based on the compression rate of the image of the image command.

First, in a case where the PDL interpreting portion 14 analyzes PDL data inputted from the terminal device and where an image command is contained, the compressed data analysis portion 16 detects the compression rate of the pertinent image (step S31), and it decides whether or not a criterion for performing a graphic conversion is fulfilled, by comparing the compression rate of the image and a preset threshold value (step S32). Besides, in a case where the compression rate of the image is equal to or better than the preset threshold value, it is judged that the criterion is fulfilled, and the graphic conversion (special image process) is performed (step S33). In any other case, it is judged that the criterion is not fulfilled, and the ordinary image process is performed (step S34).

Incidentally, although the image processing device of this exemplary embodiment employs the run length compression which is the compression scheme utilizing the continuation number of the identical pixel value in a main scan direction, it may well employ another compression scheme based on a similar concept, such as delta rho compression, MMR (Modified Modified Read) compression, or WI (Modified Huffman) compression.

Here, in the graphic conversion portion 15 in each of the above examples, the shape of the foreground color part in the image concerning the image command is reproduced with the information specifying the same feature as that of the shape (expressed using the graphic command), but it may well be reproduced with information specifying a feature similar (or approximate) to that of the shape of the foreground color part. Besides, the graphic conversion portion 15 may well be provided with the function of reproducing the shape of the foreground color part with the information which specifies the same feature, or/and the function of reproducing the shape of the foreground color part with the information which specifies the similar (or approximate) feature. Also, in a case where both the functions are provided, the function to be used may well be changed-over in accordance with a situation (a designation by a user, the analytical result of the image, or the like).

Figure 10:
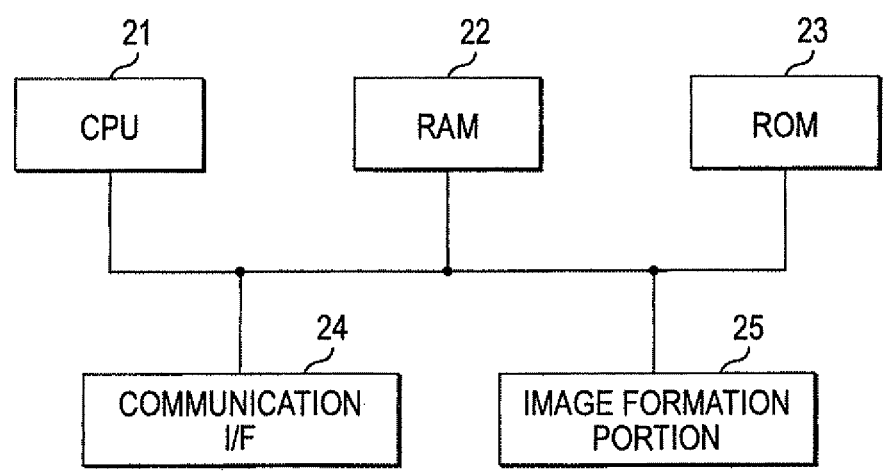
FIG. 10 is a diagram exemplifying the hardware configuration of a print device according to one exemplary embodiment of the invention.

FIG. 10 exemplifies the principal hardware of a computer which constitutes the print device of this exemplary embodiment.

The print device of this exemplary embodiment includes the computer including with such-hardware resources such as a CPU 21 which executes various operation processes, a RAM 22 which serves as the work area of the CPU 21, a ROM 23 in which a fundamental control program and programs for invoking functions according to one exemplary embodiment of the present invention are stored. a communication I/F 24 which is an interface for communications with another device (for example, the terminal device), and an image formation portion 25 which records (prints) a page image to-be-printed onto paper or the like record medium.

In addition, the programs for invoking the functions according to one exemplary embodiment of the present invention are read out of the ROM 23 and are expanded into the RAM 22, and these programs are run by the CPU 21, thereby to invoke the individual functions of the image processing portion (image processing device) according to one exemplary embodiment of the present invention.

Incidentally, although the image processing device is invoked by the single computer in this exemplary embodiment, it may well be invoked by distributively disposing individual functional portions in plural of computers.

Besides, a program according to the present invention is set into the computer in, for example, the form of loading the program from a CD-ROM or the like external storage medium in which the pertinent program is stored, or the form of receiving the program through a communication line or the like.

Besides, the invention is not restricted to the aspect in which the individual functional portions are invoked by the software configuration as in this exemplary embodiment, but the respective functional portions may well be invoked by dedicated hardware modules.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing device comprising:
   an acceptance unit which accepts an input of print data;
   a decision unit which decides whether or not the print data contains an image command concerning a two-color image data having a background color and a foreground color, wherein the image command is an instruction for processing a data to be written into a memory in pixel units; and
   a conversion unit which converts a draw process by using a graphic command representing a foreground color part in the two-color image for an image drawn area, instead of a draw process by the image command concerning the two-color image, when the decision unit decides that the image command concerning the two-color image is contained in the print data, wherein the graphic command is an instruction for processing a data to be written in the memory by a basis coordinate that represents a graphic.

2. The image processing device according to claim 1, wherein
   when the decision unit decides the print data contains the image command, the conversion unit converts the draw process by filling the image drawn area with the background color in the two-color age and then drawing the graphic representing the foreground color part in the two-color image in the foreground color for the image drawn area having been filled, instead of the draw process in pixel units concerning the two-color image.

3. The image processing device according to claim 1, wherein
   when a designation of a transmission process using a logic operation is contained in the print data, the decision unit decides whether or not a draw instruction for the two-color image in which the background color to be transmitted is white and in which the foreground color to be substituted into a drawing color is black is contained as a draw instruction for an image on a front surface side in the transmission process, and
   when the decision unit decides that the print data contains the image command, the conversion unit converts the draw process by drawing the graphic representing the foreground color part in the two-color image, for an image drawn area in which an image on a rear surface side in the transmission process is drawn, with the drawing color, and instead of the transmission process using the logic operation.

4. The image processing according to claim 1, wherein
   the two-color image data concerning the draw instruction contained in the print data is compressed by a compression scheme which utilizes the continuation number of an identical pixel value, and
   when the decision unit decides that the print data contains the image command, the conversion unit converts the draw process by drawing the graphic on condition that a compression rate of the two-color image fulfills a preset criterion.

5. A non-transitory computer readable medium storing a program causing a computer to execute a process for image processing, the process comprising:
   accepting an input of print data;
   deciding whether or not the print data contains an image command concerning a two-color image data having a background color and a foreground color, wherein the image command is an instruction for processing a data to be written into a memory in pixel units; and
   converting a draw process by using a graphic command representing a foreground color part in the two-color image for an image drawn area, instead of a draw process by the image command in pixel units concerning the two-color image, wherein the graphic command is an instruction for processing a data to be written in the memory by a basis coordinate that represents a graphic.

6. The image processing device according to claim 1, wherein the graphic command is a draw instruction of reproducing the foreground color part by segments.

7. The image processing device according to claim 1, wherein the graphic command is a draw instruction of converting a shape of the foreground color part to edge information of the foreground color.

* * * * *